Patented July 2, 1940

2,206,273

UNITED STATES PATENT OFFICE 2,206,273

PRODUCTION OF ALKYLENE IMINES

Heinrich Ulrich, Ludwigshafen-on-the-Rhine, Germany, assignor to I. G. Farbenindustrie Aktiengesellschaft, Frankfort - on - the - Main, Germany No Drawing. Application April 24, 1936, Serial No. 76,124. In Germany May 11, 1935

9 Claims. (Cl. 260—239)

The present invention relates to a new process of producing alkylene imine.

I have found that alkylene imines can be prepared in an advantageous manner by treating alkylol amine sulphuric esters at elevated temperatures with a dispersion or solutions of alkaline reacting substances, preferably of caustic alkalies or alkaline earth metal hydroxides. Suitable initial materials are for example acid ethanolamine sulphuric ester, acid N-monoalkyl-ethanolamine sulphuric esters and C-alkyl-ethanolamine sulphuric esters. The initial materials may also be substituted by cycloalkyl, aralkyl, aryl or heterocyclic radicals instead of alkyl radicals. From initial materials which are substituted on the nitrogen atom, N-substituted alkylene imines are obtained. From the sulphuric esters derived from substituted ethanolamines containing more than 2 carbon atoms per molecule new most valuable alkylene imines containing more than 2 carbon atoms are obtained. While usually aqueous solutions of the alkaline reacting substances are employed solutions thereof in other suitable solvents such as alcohols, for example methyl, ethyl and butyl alcohol may also be used. In this case it may be of advantage to effect the reaction in a closed vessel under pressure. Alkali metal alcoholates may be used as alkaline reacting substances.

The reaction can be carried out at slightly increased temperature, for example about 50° C. Frequently it is advantageous to work at about 100° C. Higher temperatures up to about 200° C. may also be employed.

The products obtainable according to this invention are distinguished by great reactivity and may therefore be employed for a great variety of chemical reactions. For example they may be converted into textile assistants according to application Ser. No. 76,260, filed on April 24, 1936, or according to my application Ser. No. 93,767, filed on August 1, 1936.

The following examples will further illustrate the nature of this invention but the invention is not restricted to these examples. The parts are by weight unless otherwise stated.

Example 1

2190 grams of ethanolamine sulphuric ester are mixed at ordinary temperature, if desired while cooling, with 4400 grams of 34 per cent caustic soda solution and the solution is made up to 7500 cubic centimeters with water. The mixture is heated and the water and ethylene-imine which distil over are collected. The water distilled off is replaced periodically or continuously by appropriate amounts of fresh water. As soon as the fraction passing over no longer has an alkaline reaction, the distillation is discontinued. The distillate is an aqueous solution of ethylene imine from which the latter may be separated by the addition of caustic soda and isolated, if desired by extraction. It is obtained in a pure form by distillation over caustic soda.

Example 2

3000 grams of 34 per cent caustic soda solution are added to 1550 grams of N-methyl-ethanolamine sulphuric ester. The mixture is made up to 5 liters with water and treated in the same manner as described in Example 1. N-methylethylene imine is obtained.

If N-butyl-ethanolamine sulphuric ester be employed instead of the corresponding methyl compound, N-butylethylene imine is obtained in an analogous manner.

Example 3

3000 grams of 34 per cent caustic soda solution are added to 1550 grams of 1.2-propanolamine sulphuric ester. The mixture is made up to 5 liters with water and treated in the manner described in Example 1. The distillate obtained is an aqueous solution of 1.2-propylene imine from which the imine may be isolated in the manner described in Example 1.

Example 4

212 parts of ethanol amine sulphuric acid ester are mixed with 105 parts of calcium oxide and the mixture is made up to 2000 parts with water. By distillation of the mixture thus obtained ethylene imine is obtained in a good yield.

Example 5

200 parts of butyl ethanol amine sulphuric acid ester are mixed with 350 parts of caustic potash solution of 45° Bé. strength and made up to 750 parts with water. By distillation of the mixture butyl ethylene imine is obtained in a yield of about from 70 to 80 per cent. Instead of caustic potash barium hydroxide may be employed.

Example 6

A mixture of 212 parts of ethanol amine sulphuric acid ester and 350 parts of caustic potash solution of 45° Bé. strength is filled up to 750 parts with water. The mixture is subjected to distillation, ethylene imine thus being obtained in a yield of from about 70 to 80 per cent.

Example 7

450 parts of caustic soda solution of 40° Bé. strength are added to 234 parts of 2.1-propanol amine sulphuric acid ester and the mixture is made up to 750 parts with water. 1.2-propylene imine is obtained in a good yield by distillation.

If instead of the said ester 325 parts of cyclohexyl ethanol amine sulphuric acid ester are employed, N-cyclohexylethylene imine is obtained in a good yield.

Example 8

210 parts of 2-amino-1-butanol sulphuric acid ester are subjected to distillation together with 440 parts of caustic soda solution of 40° Bé. strength in a vessel provided with a descending cooler, the water distilling off being replaced by continuous addition of 750 parts of fresh water to the said vessel. Ethyl ethylene imine

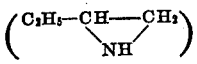

is thus obtained in practically the theoretical yield.

Example 9

326 parts of ethanol aniline sulphuric acid ester are mixed with 450 parts of caustic soda solution of 40° Bé. strength. The mixture is distilled and the liquid in the vessel is replenished by continuously adding as much fresh water as distills over. Nitrogen is led through the apparatus and a readily volatile solvent which is immiscible with water, for example benzene, toluene, tetrahydronaphthalene, ether etc. is introduced into the distillation vessel or into the cooler. The said solvent may also be applied by washing therewith the distillate already collected. A solution of N-phenyl ethylene imine in the organic solvent is thus obtained in a practically quantitative yield. By distilling off the solvent the monomeric imine may be isolated.

Example 10

225 parts of 2.1-hexanolamine sulphuric acid ester are mixed with 400 parts of 34 per cent caustic soda solution. The mixture is distilled and the water distilling over is replaced by fresh water. 1.2-hexylene imine is obtained in a good yield.

The term ethylol amine, as it appears in the claims, is to be construed as meaning an alkylol amine in which the amino and hydroxy groups are respectively attached to adjacent carbon atoms, and the term ethylene imines is defined as ethylene imine and its derivatives which are substituted on the carbon or nitrogen atom.

What I claim is:

1. The process for the production of ethylene imines, which comprises treating a mono-ethylol amine sulphuric acid ester at a temperature between about 50° and about 200° C. with a dispersion of a substance selected from the class consisting of the alkali and alkaline earth metal hydroxides.

2. The process for the production of ethylene imines, which comprises treating a mono-ethylol amine sulphuric acid ester at a temperature between about 50° and about 200° C. with an aqueous solution of a substance selected from the class consisting of the alkali and alkaline earth metal hydroxides.

3. The process for the production of ethylene imines, which comprises treating a mono-ethylol amine sulphuric acid ester at a temperature between about 50° and about 200° C. with an alcoholic solution of a substance selected from the class consisting of the akali and alkaline earth metal hydroxides.

4. The process for the production of ethylene imines, which comprises treating a mono-ethylol amine sulphuric acid ester at a temperature between about 50° and about 200° C. with a solution of an alkali metal hydroxide.

5. The process for the production of ethylene imines, which comprises treating a mono-ethylol amine sulphuric acid ester at a temperature between about 50° and about 200° C. with an aqueous solution of an alkali metal hydroxide.

6. The process for the production of ethylene imines, which comprises treating a mono-ethylol amine sulphuric acid ester at a temperature between about 50° and about 200° C. with an aqueous dispersion of an alkaline earth metal hydroxide.

7. The process for the production of ethylene imines, which comprises treating a mono-ethylol amine sulphuric acid ester at a temperature between about 50° and about 200° C. with an aqueous solution of a substance selected from the class consisting of the alkali and alkaline earth metal hydroxides and distilling off the imine formed.

8. The process for the production of ethylene imines, which comprises treating a mono-ethylol amine sulphuric acid ester at a temperature between about 50° and about 200° C. with an aqueous solution of a substance selected from the class consisting of the alkali and alkaline earth metal hydroxides and distilling off the imine formed in an inert atmosphere.

9. The process for the production of ethylene imines, which comprises treating a mono-ethylol amine sulphuric acid ester at a temperature between about 50° and about 200° C. with an aqueous solution of a substance selected from the class consisting of the alkali and alkaline earth metal hydroxides and distilling off the imine formed while bringing the distillate into contact with an organic solvent.

HEINRICH ULRICH.